United States Patent
Takai

(10) Patent No.: US 8,572,621 B2
(45) Date of Patent: Oct. 29, 2013

(54) SELECTION OF SERVER FOR RELOCATION OF APPLICATION PROGRAM BASED ON LARGEST NUMBER OF ALGORITHMS WITH IDENTICAL OUTPUT USING SELECTED SERVER RESOURCE CRITERIA

(75) Inventor: Hiroaki Takai, Tokyo (JP)

(73) Assignee: NEC Corporation, Tokyo (JP)

( * ) Notice: Subject to any disclaimer, the term of this patent is extended or adjusted under 35 U.S.C. 154(b) by 647 days.

(21) Appl. No.: 12/397,931

(22) Filed: Mar. 4, 2009

(65) Prior Publication Data

US 2009/0235250 A1   Sep. 17, 2009

(30) Foreign Application Priority Data

Mar. 14, 2008 (JP) .................................. 2008-65858

(51) Int. Cl.
*G06F 9/455* (2006.01)
*G06F 9/46* (2006.01)
*G06F 15/173* (2006.01)

(52) U.S. Cl.
USPC ................ 718/104; 718/1; 718/105; 709/226

(58) Field of Classification Search
USPC ............................. 718/1, 105, 104; 709/226
See application file for complete search history.

(56) References Cited

U.S. PATENT DOCUMENTS

| | | | | |
|---|---|---|---|---|
| 7,437,730 | B2 * | 10/2008 | Goyal ........................... | 718/105 |
| 7,493,382 | B2 * | 2/2009 | Kudo et al. ................... | 709/223 |
| 8,255,915 | B1 * | 8/2012 | Blanding et al. .............. | 718/104 |
| 2005/0251802 | A1 * | 11/2005 | Bozek et al. .................. | 718/1 |
| 2006/0005189 | A1 * | 1/2006 | Vega et al. .................... | 718/1 |
| 2007/0076738 | A1 * | 4/2007 | Ludwig et al. ................ | 370/431 |
| 2007/0130566 | A1 * | 6/2007 | van Rietschote et al. ...... | 718/1 |
| 2007/0204266 | A1 * | 8/2007 | Beaty et al. ................... | 718/1 |
| 2007/0250629 | A1 * | 10/2007 | Blanding et al. ............. | 709/226 |
| 2007/0271560 | A1 * | 11/2007 | Wahlert et al. ................ | 718/1 |
| 2008/0155089 | A1 * | 6/2008 | Hunt et al. .................... | 709/224 |
| 2008/0155223 | A1 * | 6/2008 | Hiltgen et al. ................ | 711/173 |

FOREIGN PATENT DOCUMENTS

| | | |
|---|---|---|
| JP | 10-78937 A | 3/1998 |
| JP | 11-85547 A | 3/1999 |
| JP | 2003-515813 A | 5/2003 |
| JP | 2005-115653 A | 4/2005 |
| JP | 2006-344068 A | 12/2006 |
| JP | 2007-133654 A | 5/2007 |
| JP | 2007-219963 A | 8/2007 |
| JP | 2007-536657 A | 12/2007 |
| JP | 2008-24095 A | 2/2008 |
| WO | 2007126837 A | 11/2007 |
| WO | 2007136021 A | 11/2007 |

OTHER PUBLICATIONS

Gunjan et al., Application Performance management in Virtualized Server Environments, 2006, IEEE, pp. 373-381.*

(Continued)

*Primary Examiner* — Abdullah Al Kawsar
*Assistant Examiner* — Abu Z Ghaffari

(57) ABSTRACT

A management machine according to an exemplary aspect of the invention includes a receiver that receives, from a first server, server information on the first server and AP information on a plurality of applications located in the first server, and a selector that selects a candidate application from the plurality of applications for each of a plurality of algorisms referring to the AP information and the server information, and that performs a relocation of one of the candidate applications from the first server to a second server.

9 Claims, 13 Drawing Sheets

(56) References Cited

OTHER PUBLICATIONS

Choi et al., Fast Software Component Migration for Applications Survivability in Distributed Real-Time Systems, 2004, IEEE, pp. 1-8.*

Japanese Office Action for JP2008-065856 issued Feb. 9, 2010.

N. Gomyo et al, "Performance Evaluation of Adaptive Load Balancing by Using Simulation in Massively Parallel Systems", Journal of the Japan Society for Simulation Technology, vol. 16, No. 3, Sep. 1997; pp. 55-63.

Japanese Office Action for JP2008-065858 issued May 18, 2010.

M. Mukaidono et al., "Fault-Tolerant-Computing", First Edition, Maruzen Advanced Technology, Sep. 30, 1989, pp. 179-180 (monograph 2001-00069-001), See cited doc 5 on p. 1 of translated JPOA for JP Application No. 2008-065858 dated on May 18, 2010 for explanation of relevance.

* cited by examiner

FIG.3A

60 LOGIC TABLE

| ALGORISM ID (61) | VIRTUAL RESOURCE NAME | ATTRIBUTE (63) | | ALGORISM (66) | |
| --- | --- | --- | --- | --- | --- |
| | | FLAG (64) | APPLICATION TIME (65) | | |
| 1 | MEMORY | ○ | 9:00～17:00 | RELOCATE VM 50 WHICH USES LARGEST AMOUNT OF MEMORY TO SERVER 30 WITH LARGEST AVAILABLE MEMORY AMOUNT | 67 FIRST ALGORISM |
| 2 | | ○ | 〃 | RELOCATE VM 50 WHICH USES LARGEST AMOUNT OF MEMORY TO SERVER 30 WITH SMALLEST CHANGE RATE OF AVAILABLE MEMORY AMOUNT | 68 SECOND ALGORISM |
| 3 | | ○ | 〃 | RELOCATE VM 50 WITH LARGEST CHANGE RATE OF USED MEMORY AMOUNT TO SERVER 30 WITH LARGEST AVAILABLE MEMORY AMOUNT | 69 THIRD ALGORISM |
| 4 | | ○ | 〃 | RELOCATE VM 50 WITH LARGEST CHANGE RATE OF USED MEMORY AMOUNT TO SERVER 30 WITH SMALLEST CHANGE RATE OF AVAILABLE MEMORY AMOUNT | |
| 5 | DISKS (ALL) | ○ | 〃 | RELOCATE VM 50 WITH LARGEST NUMBER OF IO ISSUES TO VIRTUAL DISK 55 (ALL) TO SERVER 30 WITH SMALLEST NUMBER OF IO ISSUES TO DISK 35 | |
| 6 | | ○ | 〃 | RELOCATE VM 50 WITH LARGEST NUMBER OF IO ISSUES TO VIRTUAL DISK 55 (ALL) TO SERVER 30 WITH SMALLEST CHANGE RATE OF NUMBER OF IO ISSUES TO DISK 35 | |
| ... | | ○ | 〃 | RELOCATE VM 50 WITH LARGEST CHANGE RATE OF NUMBER OF IO ISSUES TO VIRTUAL DISK 55 (ALL) TO SERVER 30 WITH SMALLEST NUMBER OF IO ISSUES TO DISK 35 | |
| | | ○ | 〃 | RELOCATE VM 50 WITH LARGEST CHANGE RATE OF NUMBER OF IO ISSUES TO VIRTUAL DISK 55 (ALL) TO SERVER 30 WITH SMALLEST CHANGE RATE OF NUMBER OF IO ISSUES TO DISK 35 | |

( FOLLOWED BY FIG. 3B )

FIG. 3B (FOLLOWING FIG. 3A)

| | | | |
|---|---|---|---|
| | | | |
| VIRTUAL DISK (NO. 1) (VIRTUAL DISK NAME 92) | ○ | 12:00~19:00 | RELOCATE VM 50 WITH LARGEST NUMBER OF IO ISSUES TO VIRTUAL DISK 55 (NO. 1) TO SERVER 30 WITH SMALLEST NUMBER OF IO ISSUES TO DISK 35 |
| | ○ | " | RELOCATE VM 50 WITH LARGEST NUMBER OF IO ISSUES TO VIRTUAL DISK 55 (NO. 1) TO SERVER 30 WITH SMALLEST CHANGE RATE OF NUMBER OF IO ISSUES TO DISK 35 |
| | ○ | " | ARELOCATE VM 50 WITH LARGEST CHANGE RATE OF NUMBER OF IO ISSUES TO VIRTUAL DISK 55 (NO. 1) TO SERVER 30 WITH SMALLEST NUMBER OF IO ISSUES TO DISK 35 |
| | ○ | " | RELOCATE VM 50 WITH LARGEST CHANGE RATE OF NUMBER OF IO ISSUES TO VIRTUAL DISK 55 (NO. 1) TO SERVER 30 WITH SMALLEST CHANGE RATE OF NUMBER OF IO ISSUES TO DISK 35 |
| VIRTUAL DISK (NO. 2) (VIRTUAL DISK NAME 92) | × | 9:00~17:00 | RELOCATE VM 50 WITH LARGEST NUMBER OF IO ISSUES TO VIRTUAL DISK 55 (NO. 2) TO SERVER 30 WITH SMALLEST NUMBER OF IO ISSUES TO DISK 35 |
| | × | " | RELOCATE VM 50 WITH LARGEST NUMBER OF IO ISSUES TO VIRTUAL DISK 55 (NO. 2) TO SERVER 30 WITH SMALLEST CHANGE RATE OF NUMBER OF IO ISSUES TO DISK 35 |
| | × | " | RELOCATE VM 50 WITH LARGEST CHANGE RATE OF NUMBER OF IO ISSUES TO VIRTUAL DISK 55 (NO. 2) TO SERVER 30 WITH SMALLEST NUMBER OF IO ISSUES TO DISK 35 |
| | × | " | RELOCATE VM 50 WITH LARGEST CHANGE RATE OF NUMBER OF IO ISSUES TO VIRTUAL DISK 55 (NO. 2) TO SERVER 30 WITH SMALLEST CHANGE RATE OF NUMBER OF IO ISSUES TO DISK 35 |
| CPU | ○ | " | RELOCATE VM 50 WITH LARGEST CPU UTILIZATION TO SERVER 30 WITH SMALLEST CPU UTILIZATION |
| | ○ | " | RELOCATE VM 50 WITH LARGEST CHANGE RATE OF CPU UTILIZATION TO SERVER 30 WITH SMALLEST CHANGE RATE OF CPU UTILIZATION |

FIG.4

70 THRESHOLD TABLE

| REAL RESOURCE NAME | THRESHOLD | |
|---|---|---|
| MEMORY | MEMORY UTILIZATION (%) | |
| | CHANGE RATE OF AVAILABLE MEMORY AMOUNT (MB/SECOND) | |
| DISKS (ALL) | NUMBER OF IO ISSUES (TIMES/SECOND) | |
| | IO TRANSFER SPEED (MB/SECOND) | |
| | IO BUSY RATE (m SECOND/SECOND) | |
| DISK (NO. a) (DISK NAME 91) | NUMBER OF IO ISSUES (TIMES/SECOND) | |
| | IO TRANSFER SPEED (MB/SECOND) | |
| | IO BUSY RATE (m SECOND/SECOND) | |
| DISK (NO. b) (DISK NAME 91) | NUMBER OF IO ISSUES (TIMES/SECOND) | |
| | IO TRANSFER SPEED (MB/SECOND) | |
| | IO BUSY RATE (m SECOND/SECOND) | |
| CPU | CPU UTILIZATION (%) | |

FIG.5

80 RELOCATION TABLE

| SELECTION NUMBER | ALGORISM ID | RELOCATION TARGET | | RELOCATION DESTINATION |
|---|---|---|---|---|
| | | SERVER ID | VMID | SERVER ID |
| ⋮ | ⋮ | ⋮ | ⋮ | ⋮ |

SELECTION RESULT

FIG.6

90 DISK CONFIGURATION TABLE

| SERVER ID (83) | DISK NAME (91) | VIRTUAL DISK NAME (92) |
|---|---|---|
| 1 | DISK (NO. a) | VIRTUAL DISK NAME (NO. 1) |
|   | DISK (NO. b) | VIRTUAL DISK NAME (NO. 2) |
| ⋮ | ⋮ | ⋮ |
|   |   |   |

FIG.7

A0 SERVER INFORMATION
83

| SERVER ID | MOUNTED MEMORY AMOUNT (MB) | AVAILABLE MEMORY AMOUNT (MB) | CHANGE RATE OF AVAILABLE MEMORY AMOUNT (MB/SECOND) | NUMBER OF IO ISSUES (TIMES/SECOND) | IO TRANSFER SPEED (MB/SECOND) | IO BUSY RATE (m SECOND/SECOND) | NUMBER OF IO ISSUES (TIMES/SECOND) | IO TRANSFER SPEED (MB/SECOND) | IO BUSY RATE (m SECOND/SECOND) | NUMBER OF IO ISSUES (TIMES/SECOND) | IO TRANSFER SPEED (MB/SECOND) | IO BUSY RATE (m SECOND/SECOND) | CPU UTILIZATION (%) |
|---|---|---|---|---|---|---|---|---|---|---|---|---|---|

ENTRIES CORRESPONDING TO DISKS (ALL)
ENTRIES CORRESPONDING TO DISKS (NO. a)
ENTRIES CORRESPONDING TO DISKS (NO. b)

FIG.8

| B0 AP INFORMATION | | |
|---|---|---|
| SERVER ID | | |
| VMID (=1) | PRIORITY LEVEL | |
| MOUNTED MEMORY AMOUNT (MB) | | ⎫ ENTRIES CORRESPONDING TO VIRTUAL DISKS (ALL) |
| USED MEMORY AMOUNT (MB) | | |
| CHANGE RATE OF USED MEMORY AMOUNT (MB/SECOND) | | |
| NUMBER OF IO ISSUES (TIMES/SECOND) | | ⎫ ENTRIES CORRESPONDING TO VIRTUAL DISKS (NO. 1) |
| IO TRANSFER SPEED (MB/SECOND) | | |
| IO BUSY RATE (m SECOND/SECOND) | | |
| NUMBER OF IO ISSUES (TIMES/SECOND) | | ⎫ ENTRIES CORRESPONDING TO VIRTUAL DISKS (NO. 2) |
| IO TRANSFER SPEED (MB/SECOND) | | |
| IO BUSY RATE (m SECOND/SECOND) | | |
| NUMBER OF IO ISSUES (TIMES/SECOND) | | |
| IO TRANSFER SPEED (MB/SECOND) | | |
| IO BUSY RATE (m SECOND/SECOND) | | |
| CPU UTILIZATION (%) | | |
| ... | | |
| VMID (=n) | | ⎫ SAME AS ABOVE ENTRIES |

ENTRIES EXIST CORRESPONDING TO VM 50

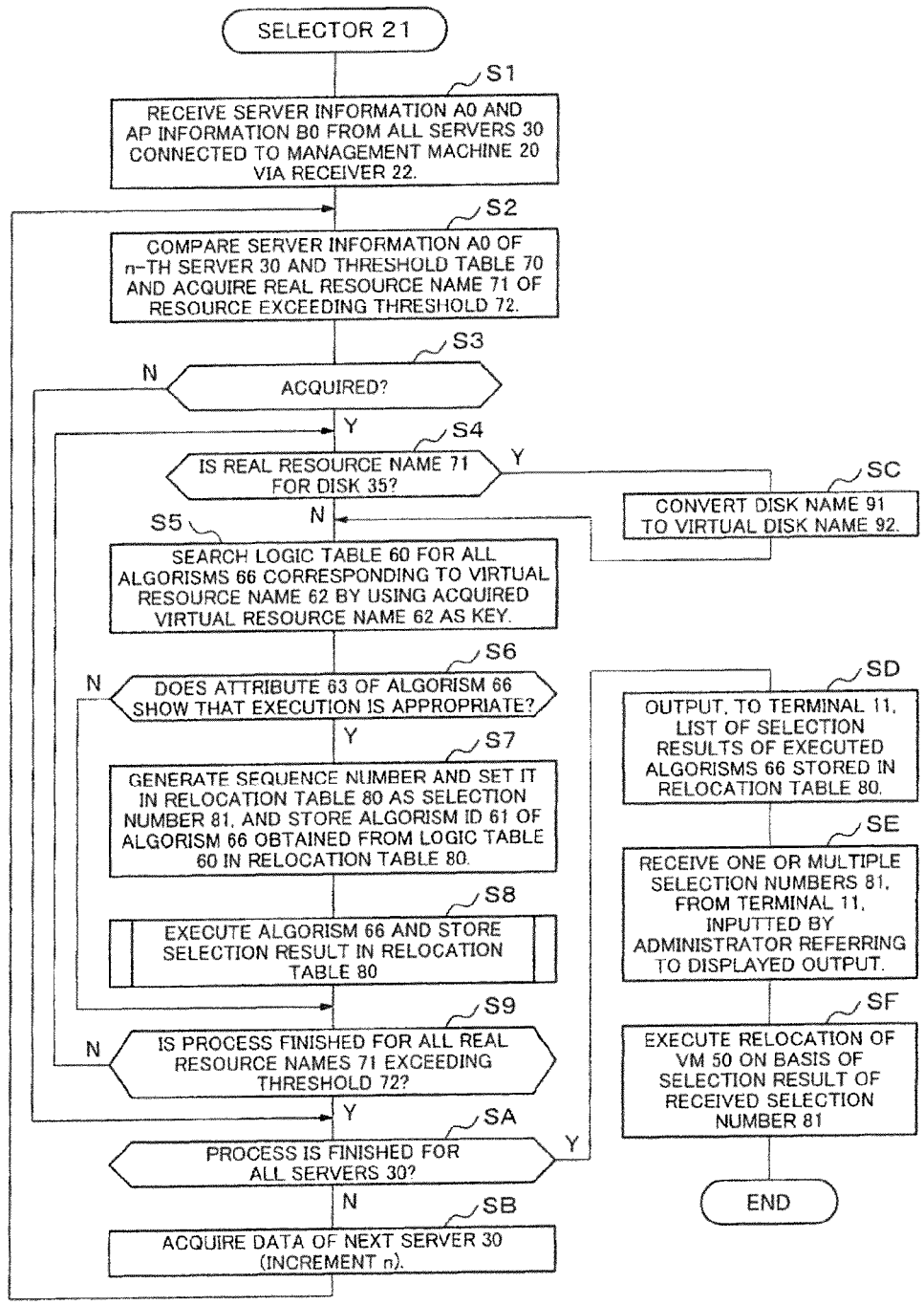

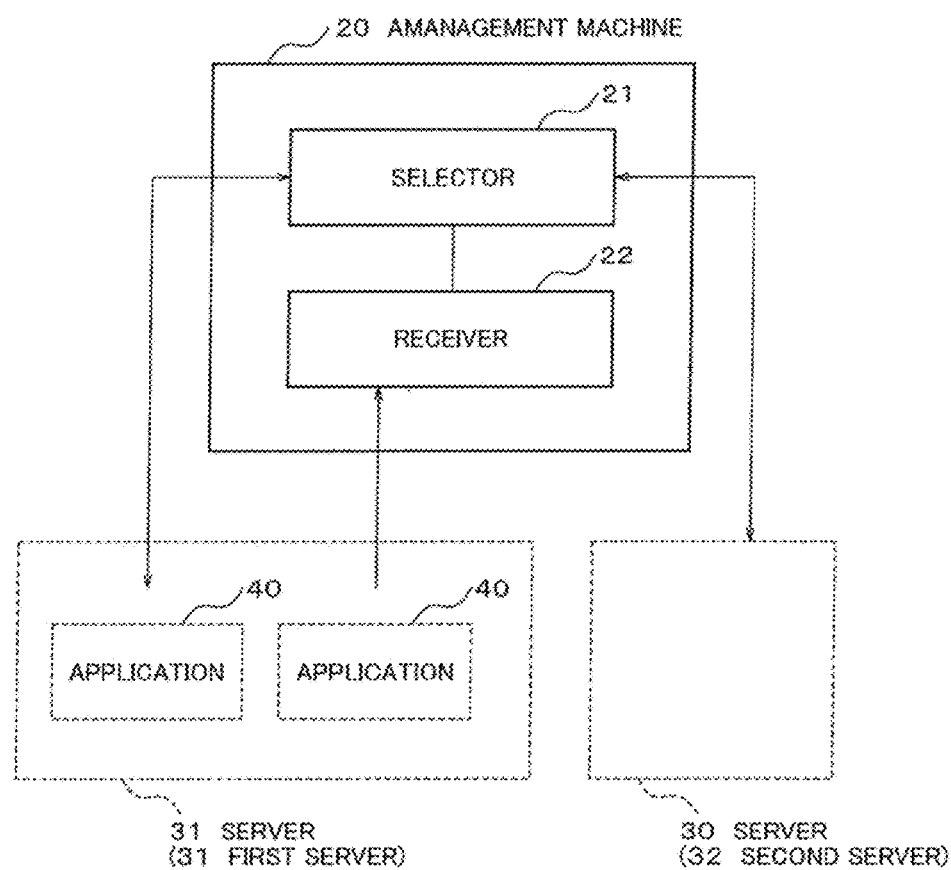

ed results

SELECTION OF SERVER FOR RELOCATION OF APPLICATION PROGRAM BASED ON LARGEST NUMBER OF ALGORITHMS WITH IDENTICAL OUTPUT USING SELECTED SERVER RESOURCE CRITERIA

This application is based on Japanese Patent Application No. 2008-065858 filed on Mar. 14, 2008, and including a specification, claims, drawings and summary. The disclosure of the above Japanese Patent Application is incorporated herein by reference in its entirely.

BACKGROUND OF THE INVENTION

1. Field of the Invention

The present invention relates to a management machine, a management system, a management program, and a management method.

2. Description of the Related Art

Japanese Patent Application Publication No. 2005-115653 discloses a virtual machine management server that reads data on the storage capacities of servers and data on the storage capacities of virtual machines to optimally locate the virtual machines to the servers based on the data.

Japanese Patent Application Publication No. 2003-515813 discloses a volume manager that uses several different algorisms, such as a simple majority system and a weighted voting system, when determining whether a volume list is appropriate.

Japanese Patent Application Publication No. 2003-16043 discloses a server that allocates the same data processing task to a plurality of terminals and evaluates the processed results by majority voting so as to determine a correct operation result.

SUMMARY OF THE INVENTION

An exemplary object of the present invention provides a management machine, a management system, a management program, and a management method for relocating an application based on various environmental factors.

A management machine according to an exemplary aspect of the invention includes a receiver that receives, from a first server, server information on the first server and AP information on a plurality of applications located in the first server, and a selector that selects a candidate application from the plurality of applications for each of a plurality of algorisms referring to the AP information and the server information, and that performs a relocation of one of the candidate applications from the first server to a second server.

A management method according to an exemplary aspect of the invention includes receiving, from a first server, server information on the first server and AP information on a plurality of applications located in the first server, selecting a candidate application from the plurality of applications for each of a plurality of algorisms referring to the AP information and the server information, and performing a relocation of one of the candidate applications from the first server to a second server.

A computer readable medium according to an exemplary aspect of the invention stores thereon a management program enabling a computer to receive, from a first server, server information on the first server and AP information on a plurality of applications located in the first server, select a candidate application from the plurality of applications for each of a plurality of algorisms referring to the AP information and the server information, and perform a relocation of one of the candidate applications from the first server to a second server.

BRIEF DESCRIPTION OF THE DRAWINGS

FIG. 3A shows the first part of a configurational example of a logic table 60;

FIG. 3B shows the second part of a configurational example of a logic table 60;

FIG. 4 shows a configurational example of a threshold table 70;

FIG. 5 shows a configurational example of a relocation table 80;

FIG. 6 is an example of a disk configuration table 90 based on the allocation example in FIG. 2;

FIG. 7 shows a configurational example of server information A0;

FIG. 8 shows a configurational example of AP information B0;

FIG. 9 is an example flowchart of a process executed by a selector 21;

FIG. 12 shows the configuration of a management machine 20.

DESCRIPTION OF THE EXEMPLARY EMBODIMENTS

A first exemplary embodiment of the present invention will be described below.

Figure 1:
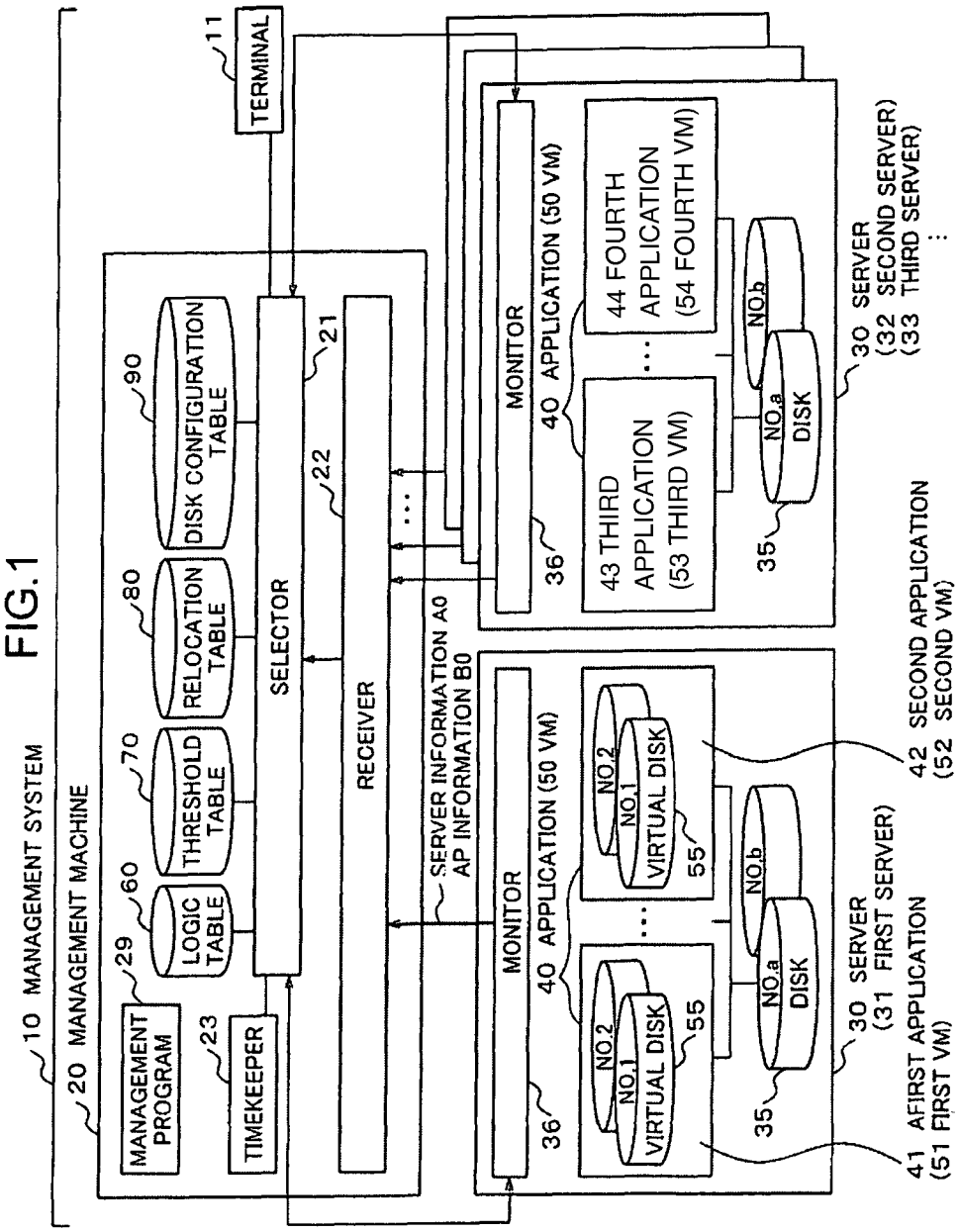
FIG. 1 shows a configurational example of a management system 10 according to a first embodiment of the present invention.

FIG. 1 shows a configurational example of a management system 10 according to a first embodiment of the present invention. The management system 10 includes a management machine 20, and a plurality of servers 30 (for example, a first server 31, a second server 32, a third server 33 . . . ) and a terminal 11 connected to the management machine 20.

The management machine 20 includes a selector 21, a receiver 22, a timekeeper 23, a logic table 60, a threshold table 70, a relocation table 80 and a disk configuration table 90. The selector 21, the receiver 22 or the timekeeper 23 functions when a processor of the management machine 20, which is a computer, reads and executes a management program 29 stored in a main memory (not shown in FIG. 1). Equivalent functions may be implemented by hardware. The logic table 60, the threshold table 70, the relocation table 80, and the disk configuration table 90 are data stored in the main memory or external storage devices (not shown in FIG. 1). They may be configured as databases.

The server 30 is a computer. The server 30 includes a monitor 36 and disks 35. The server 30 executes applications 40, which are programs, under the control of the monitor 36. In this case, the applications 40 are located in the server 30. In general, one or more of applications 40 are located in the server 30. For example, first application 41 and second application 42 are located in a first server 31.

The management machine 20 determines which application 40 to be located in which server 30 based on various factors, such as availability of resources and performance of the management system 10. The management machine 20 changes the location of the applications 40 (performs relocation) if needed.

The application 40 is, for example, a virtual machine (VM) 50. Accordingly, the first application 41 is a first VM 51, and the second application 42 is a second VM 52.

Figure 2:
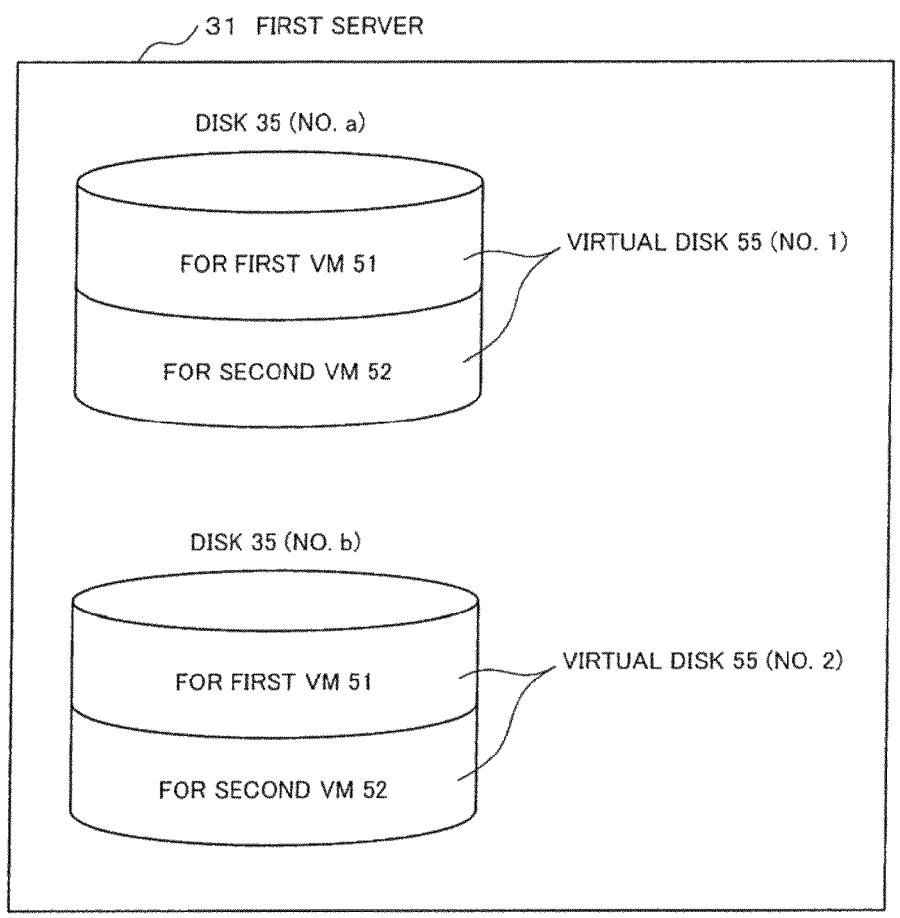
FIG. 2 shows an example of allocation of a virtual disk 55 to a disk 35.

The virtual disks 55 of each VM 50 are allocated to the disks 35 of the server 30. Specifically, the input to and the output from the virtual disk 55 of each VM 50 are executed actually through the disk 35 of the server 30, as the input to and the output from the disk 35. FIG. 2 shows one example of this allocation. In this example, the first server 31 is provided with two disks 35 having device addresses No. a and No. b. Each of the first VM 51 and the second VM 52 is provided with two virtual disks 55 having virtual device addresses No. 1 and No. 2, respectively. In this example, the virtual disk 55 having the virtual device address No. 1 of the first VM 51 is allocated in the disk 35 having the device address No. a, and the virtual disk 55 having the virtual disk address No. 2 is allocated in the disk 35 having the device address No. b. The virtual disk 55 No. 1 of the second VM 52 is allocated in the disk 35 No. a and the virtual disk 55 having the virtual device address No. 2 is allocated in the disk 35 No. b.

In order to individually manage the resource availability or the load statuses of the respective disks 35 (such as No. a and No. b) or the respective virtual disks 55 (such as virtual disk 55 No. 1 and No. 2), it is required to know the above-described correspondence relationship. The disk configuration table 90 stores the correspondence relationships between the disks 35 and the virtual disks 55. FIG. 6 is an example of the disk configuration table 90 based on the above-described allocation example.

Note that the correspondence relationship between the disks 35 and the virtual disks 55 is rot limited to the example in FIG. 6. It is only required that the correspondence relationship be stored in the disk configuration table 90. For example, if the configurations of the virtual disks 55 of each of the VMs 50 are not the same, the disk configuration table 90 may store a pair of an identifier of the VM 50 and a virtual disk name 92 in place of the virtual disk name 92.

FIGS. 3A and 3B show a configurational example of the logic table 60. The logic table 60 stores an algorism ID 61, a virtual resource name 62, an attribute 63, and an algorism 66. The attribute 63 includes a flag 64 and an application time 65.

The algorism ID 61 is an identifier of the algorism 66, which is unique within the management system 10. The virtual resource name 62 indicates the names of various resources in the VM 50, each of the names being unique within the management system 10. The virtual resource name 62 includes names such as central processing unit (CPU), memory, disks (all), and communication device. The virtual resource name 62 of each of the virtual disks 55 is a virtual disk name 92, such as a virtual disk (No. 1).

The flag 64 shows whether the algorism 66 is effective or ineffective. The application time 65 shows a time period during which the algorism 66 is used. These values of the attribute 63 are set to the logic table 60 by, for example, an administrator of the management system 10 by using the terminal 11 or the like. The administrator may set the values of the attributes 63 so that the algorisms 66 to be used by the management system 10 can be properly selected by the management machine 10.

The selector 21 executes the algorism 66 and selects the VM 50 which is located in one of the server 30 and another server 30 in which that VM 50 is to be relocated. The selector 21 outputs the selection result (a relocation target 82 and a relocation destination 85) to the relocation table 80. For example, the selector 21 selects from the first VM 51 and the second VM 52 which are both located in the first server 31, the second VM 52 as a candidate to be relocated to the second server 32, and outputs the selection result to the relocation table 80.

The algorism 66 is classified so as to correspond to the virtual resource name 62. There may be a plurality of algorisms 66 which corresponds to one virtual resource name 62. For example, a first algorism 67, a second algorism 68, and a third algorism 69 may all correspond to the virtual resource name 62 "memory".

One algorism 66 is described so as to select, based on resource information of the corresponding virtual resource name 62, the candidate VM 50 to be relocated and the server 30 to be a relocation destination, and to output the selection result. The selector 21 executes a plurality of algorisms 66 and stores, in the relocation table 80, selection results obtained according to the individual algorisms 66. The selector 21 relocates the VM 50 according to any one of the stored selection results.

Note that the algorisms 66 can be described in various ways. The algorism 66 may be stored in the logic table 60 as a program described in a certain script language. Or a subroutine describing the algorism may be stored in the main memory or external storage devices and an entry address thereof may be stored in the logic table 60.

The algorism 66 may be described as a rule. In this case, execution of the algorism 66 by the selector 21 means that the selector 21 interprets the rule and performs selection according to the rule.

The algorisms 66 include the following examples.

1) Relocate the VM 50 which uses the largest amount of the memory to the server 30 with the largest available memory amount.

2) Relocate the VM 50 which uses the largest amount of the memory to the server 30 with the smallest change rate of the available memory amount.

3) Relocate the VM 50 with the largest change rate of the used memory amount to the server 30 with the largest available memory amount.

4) Relocate the VM 50 with the largest change rate of the used memory amount to the server 30 with the smallest change rate of the available memory amount.

5) Relocate the VM 50 with the largest number of IO issues to the virtual disk 55 to the server 30 with the smallest number of IO issues to the disk 35.

6) Relocate the VM 50 with the largest number of IO issues to the virtual disk 55 to the server 30 with the smallest change rate of the number of IO issues to the disk 35.

7) Relocate the VM 50 with the largest change rate of the number of IO issues to the virtual disk 55 to the server 30 with the smallest number of IO issues to the disk 35.

8) Relocate the VM 50 with the largest change rate of the number of IO issues to the virtual disk 55 to the server 30 with the smallest change rate of the number of IO issues to the disk 35.

9) Relocate the VM 50 with the largest CPU utilization to the server 30 with the smallest CPU utilization.

10) Relocate the VM 50 with the largest CPU utilization to the server 30 with the smallest change rate of the CPU utilization.

Note that, the algorisms 66 relating to the virtual disk 55 include the algorism 66 for each of the virtual disks 55 (such as the virtual disks 55 No. 1 and No. 2) and the algorism 66 for all the virtual disks 55. The change rate of a certain value indicates a variation of the value per unit time.

The algorism 66 may include combinations of a plurality of conditions about the same virtual resource name 62 as selection conditions for the VM 50. For example, the algorism 66 may include the selection condition for the VM 50 such that "VM 50 with the largest change rate of the used memory amount among the VMs 50 in each of which uses memories equal to or larger than 5 GB."

FIG. 4 shows a configurational example of the threshold table 70. For example, the administrator sets the contents of the threshold table 70 before starting the management system 10. The threshold table 70 includes thresholds 72 corresponding to real resource names 71.

The real resource name 71 indicates the names of various resources of the server 30, each of the names being unique within the management system 10. The real resource name 71 includes names such as CPU, memory, disks (all), communication device. The real resource name 71 of each of the individual disks 35 (such as the disk No. a or No. b) is a disk name 91 such as a disk (No. a).

The threshold 72 is a reference value corresponding to the real resource name 71. Relocation is performed when the load of the server 30 is high. The threshold 72 is a reference value for determining whether the load of the server 30 is high.

The threshold 72 corresponding to the memory includes a memory utilization (%), a change rate of available memory amount (MB/second) and the like. The threshold 72 corresponding to the disk 35 includes the number of IO issues (times/second), an IO transfer speed (MB/second), an IO busy rate (m second/second) and the like. The threshold 72 corresponding to the CPU is a CPU utilization (%) and the like.

The threshold table 70 may store information on only a part of the resources and the measured values described above, or may store information on other resources and measured values.

FIG. 5 shows a configurational example of the relocation table 80. The relocation table 80 is a storage area for storing the selection results which show the candidate VM 50 to be relocated and the relocation destination server 30, each of the selection results being obtained by the selector 21 by executing one of the algorisms 66. The relocation table 80 includes a selection number 81, an algorism ID 61, selection results (a relocation target 82 and a relocation destination 85). The relocation target 82 includes the identifier (server ID 83) of the server 30 in which the candidate VM 50 to be relocated is currently located and the identifier (VM ID 84) of the VM 50 to be relocated. The relocation destination 85 includes the server ID 83 of the server 30 which is the relocation destination of the candidate VM 50 to be relocated.

In order to select and execute the algorism 66, the selector 21 needs, from the server 30, information (server information A0) relating to resources of the server 30 and information (AP information B0) relating to resources used by the VMs 50 located in the server 30. In the course of execution of the VMs 50 located in the server 30, the monitor 36 collects the server information A0 and the AP information B0. This collection may be performed by using a well-known approach such as acquisition of an execution log.

The receiver 22 acquires the server information A0 and AP information B0 from the monitor 36, and transmits these pieces of the information to the selector 21.

FIG. 7 shows a configurational example of the server information A0. The server information A0 includes the server ID 83 and the information (load information) corresponding to each of the resources of the server 30 from which the information is collected. The server information A0 may include a plurality of kinds of measured values on the same resource.

The information corresponding to each of the resources includes the following. The information corresponding to the memory includes a mounted memory amount (MB), an available memory amount (MB), a change rate of available memory amount (MB/second), and the like. The information corresponding to the disks 35 includes the number of IO issues (times/second), an IO transfer speed (MB/second), an IO busy rate (m second/second), and the like. The information corresponding to the disks 35 also includes information corresponding to all the disks 35 and the information corresponding to each of the disks 35 (such as the disks No. a and No. b). The information corresponding to the CPU includes the CPU utilization and the like. The server information A0 may store information on only a part of the resources and the measured values described above, or may store information on other resources and measured values.

FIG. 8 shows a configurational example of the AP information B0. The AP information B0 includes the server ID 83 of the server 30 from which the information is collected. The AP information B0 repeatedly includes the entries corresponding to the VM 50 which are located in the server 30. Each entry includes the VM ID 84 of the corresponding VM 50, a priority level B1 of the VM 50, and the information corresponding to each resource used by the VM 50. The AP information B0 may include a plurality of kinds of measured values on the same resource.

The information corresponding to each of the resources includes the following. The information corresponding to the memory includes a mounted memory amount (MB), a used memory amount (MB), a change rate of used memory amount (MB/second), and the like. The information corresponding to the virtual disk 55 includes the number of IO issues (times/second), an IO transfer speed (MB/second), IO busy rate (m second/second), and the like. The information corresponding to the virtual disk 55 also includes the information corresponding to all the virtual disk 55 and the information corresponding to each of the virtual disks 55 (such as the virtual disks 55 No. 1 and No. 2). The information corresponding to the CPU includes the CPU utilization and the like. The AP information B0 may store information on only a part of the resources and the measured values described above, or may store information on other resources and measured values.

FIG. 9 is a flowchart of a process executed by the selector 21. The selector 21 receives the server information A0 and the AP information B0 from all the servers 30 which are connected to the management machine 20 through receiver 21 (S1).

The selector 21 compares the server information A0 of the n-th server 30 (starting from the first server) with threshold table 70, and acquires the real resource name 71 of the resource which exceeds the threshold 72 (S2). The selector 21 calculates, for example, the memory utilization from the available memory amount and the mounted memory amount which are stored in the server information A0, and determines whether the calculated value exceeds the threshold 72 for the memory utilization. If the calculated value exceeds the threshold 72, the selector 21 acquires "memory" as the real resource name 71. Furthermore, the selector 21 determines whether the number of IO issues of the disk 35 No. a stored in the server information A0 exceeds the threshold 72 for the number of IO issues of the disk 35 No. a. If the number of IO issues exceeds the threshold 72, the selector 21 acquires "the disk 35 No. a" as the real resource name 71. The selector 21 performs the same process for other resources.

When the real resource name 71 exceeding the threshold 72 is acquired (Y in S3), and the acquired real resource name 71 is for the one of the disks 35 (Y in S4), the selector 21 converts the disk name 91 to the virtual disk name 92 (SC). In short, the selector 21 converts the real resource name 71 to the virtual resource name 62. This allows the selector 21 to identify which of the virtual disks 55 is required of load adjustment in order to adjust the load of each of the disks 35. In this conversion, the selector 21 searches the disk configuration table 90 to obtain the virtual disk name 92 by using the server ID 83 and disk name 91 of the n-th server 30 as keys.

If the real resource name 71 is not for one of the disks 35 (N in S4), the real resource name 71 and the virtual resource name 62 are same. Thus, the conversion is not needed and the selector 21 uses the real resource name 71 as it is as the virtual resource name 62.

The selector 21 searches the logic table 60 to acquire all the algorisms 66 corresponding to the virtual resource name 62 by using the acquired virtual resource name 62 as a key (S5).

The selector 21 determines whether the execution of the algorism 66 is appropriate by checking the attribute 63 (S6). Specifically, the selector 21 determines that the execution is appropriate when the flag 64 shows "effective" and the current time shown by the timekeeper 23 is in a range of the application time 65. If not, the selector 21 determines that the execution is not appropriate.

When it is determined that the execution is appropriate (Y in S6), the selector 21 generates a sequence number. The selector 21 sets the generated sequence number in the relocation table 80 as a selection number 81 and, furthermore, stores the algorism ID 61 of the algorism 66 obtained from the logic table 60 in the relocation table 80 (S7).

Figure 10:
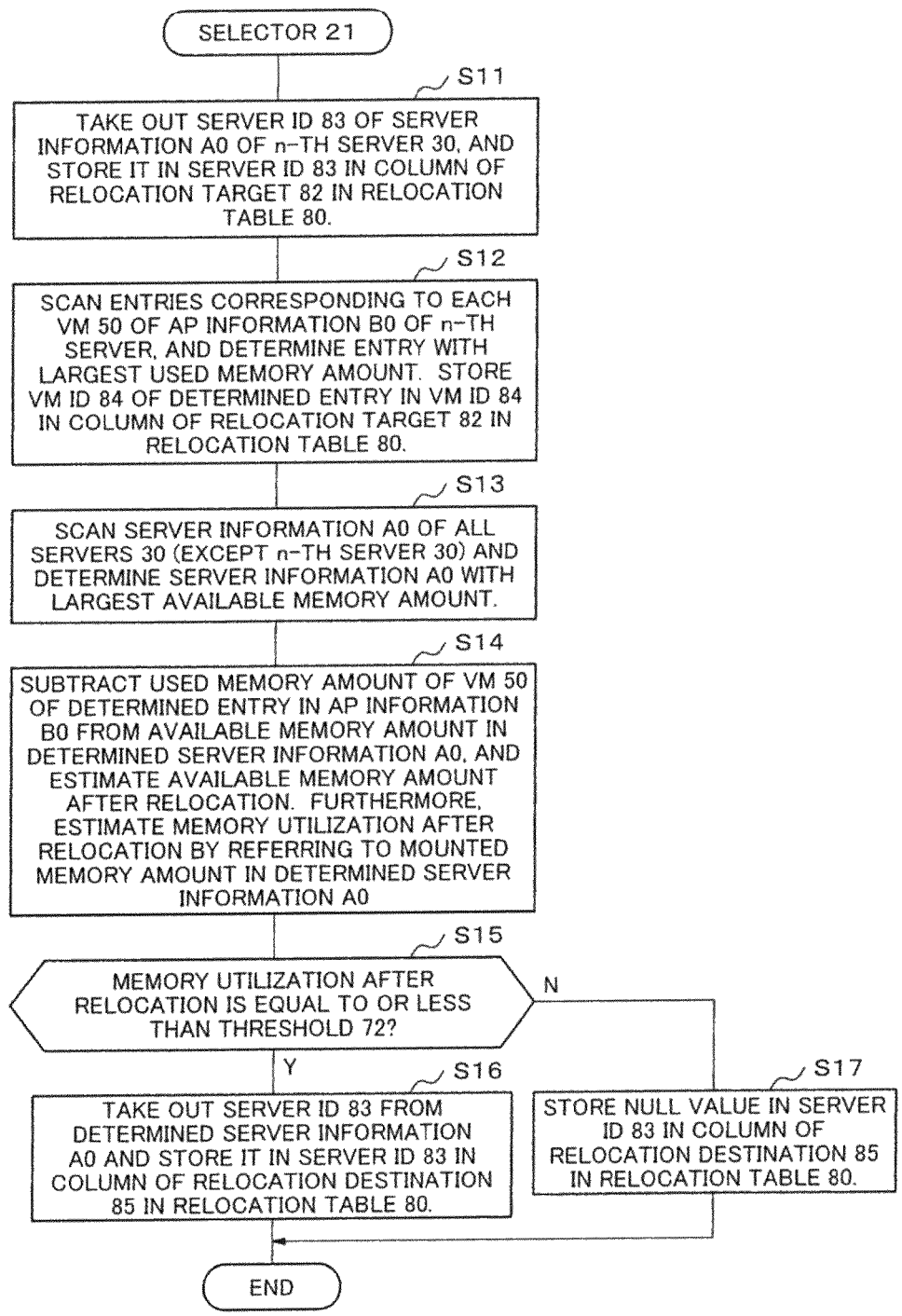
FIG. 10 is an example of an execution flowchart of an algorism 66.

The selector 21 executes the obtained algorism 66 and stores the selection result in the relocation table 80 (S8). FIG. 10 is an example of the execution flowchart of the algorism 66. It should be noted that when there exist a plurality of algorisms 66 whose execution is determined as appropriate in step S6 (Y in S6), the selector 21 repeats steps S7 and 38 for each algorism 66. For example, this corresponds to the case where the selector 21 determines that execution of all the algorisms 66 in the virtual resource name 62 "memory" (algorism IDs are 1 to 4) is appropriate, in the example of the logic table 60 in FIG. 3.

If it is determined that the execution is not appropriate (N in S6), the selector 21 does not execute steps S7 and S8.

The selector 21 repeats the processes from step S4 until the execution of the processes from steps S4 to S8 is finished for all the real resource names 71 exceeding the threshold 72 (N in S9). If there is no real resource name 71 exceeding the threshold 72 (N in S3), or if the execution of the processes from S4 to S8 is finished for all the real resource names 71 exceeding the threshold 72 (Y in S9), the selector 21 determines whether the processes are finished for all the servers 30 (SA).

If not (N in SA), the selector 21 acquires data of the next server 30 (increment n) (SB), and executes the process from step s2.

If finished (Y in SA), the selector 21 outputs, to the terminal 11, the list of the selection results of the execution algorisms 66 stored in the relocation table 80. The selector 21 receives one or more selection numbers 81, from the terminal 11 (SE), the selection numbers inputted by the administrator referring to the displayed output. The selector 21 relocates (SF) the VM 50 on the basis of the selection result of the selection number 81 inputted above.

The relocation is performed according to the following procedures, for example. The selector 21 transmits, to the server 30 having the server ID 83 in the column of the relocation target 82 in the relocation table 80 (for example, the first server 31), the VM ID 84 in the column of the relocation target 82 (for example, the identifier of the first VM 51) and the server ID 83 in the column of the relocation destination 85 (for example, the identifier of the second server 32). The first server 31 receiving these identifiers transmits, to the second server 32, the information on the configuration and execution status of the first VM 51 and the data in the virtual disk 55 of the corresponding VM 51. The first server 31 also erases the transmitted information and data held therein. The second server 32 receives, from the first server 31, the information on the configuration and execution status of the first VM 51 and the data in the virtual disk 55 of the VM 51, stores the received data in its own main memories and disks 35, and manages them as programs to be executed under the control of its monitor 36. In this manner, the selector 21 finishes the relocation of the first VM 51 from the first server 31 to the second server 32. However, the procedure of relocation is not limited this. For example, the selector 21 may receive, from the first server 31, the information on the configuration and execution status of the first VM 51 and the data in the virtual disk 55, which is then transmitted to the second server 32.

FIG. 10 is an example of the execution flowchart of the algorism 66. The algorism 66 instructing that "relocate the VM 50 which uses the largest amount of the memory to the server with the largest available memory amount" is taken as an example. The same execution flowchart is performed for other algorisms 66.

The selector 21 takes out the server ID 83 in the server information A0 of the n-th server 30, and stores the server ID 83 in the column of the relocation target 82 in the relocation table 80 (S11). The selector 21 scans the entries corresponding to each VM 50 of the AP information B0 of the n-th server 30, and specifies the entry with the largest used memory amount. The selector 21 stores the VM ID 84 of the specified entry in the VM 84 in the column of the relocation target 82 in the relocation table 80 (S12).

The selector 21 scans the server information A0 of all the servers 30 (except the n-th server 30), and specifies the server information A0 with largest available memory amount (S13). The selector 21 subtracts the used memory amount of the VM 50 of the entry in the specified AP information B0 from the available memory amount in the specified server information A0 to estimate the available memory amount after relocation. Furthermore, the selector 21 estimates the memory utilization after relocation by referring to the mounted memory amount in the specified server information A0 (S14).

If the memory utilization after relocation is equal to or lower than the threshold 72 in the threshold table 70 (Y in S15), the selector 21 takes out the server ID 83 from the specified server information A0 and stores the taken out server ID 83 in the server ID 83 in the column of the relocation destination 85 in the relocation table 80 (S16).

If the memory utilization after relocation exceeds the threshold 72 in the threshold table 70 (N in S15), the selector 21 stores a Null value in the server ID 83 in the column of the relocation destination 85 in the relocation table 80 (S17). This means that the selector 21 cannot generate an appropriate selection result by executing the algorism 66.

In the above description, the algorism 66 judges the resource usage of servers 30 on the basis of the server information A0 and the AP information B0. However, the algorism 66 is not limited to this. The algorism 66 may refer to configuration information of servers 30 or the VMs 50, which is information including the mounted memory amount, the CPU performance speed, the number of connected disks, and the like. Also, the algorism 66 may refer to the preference value of resource allocation like the priority level B1.

In addition, the selector 21 may limit the maximum number of the algorisms 66 to be executed in the flow in FIG. 9.

Furthermore, the application 40 is not limited to the VM 50. The application 40 may be a general batch job or online job. In this case, the application 40 may have a file on the disk 35 in place of the virtual disk 55.

The management system 10 according the present embodiment can appropriately perform relocation of the applications 40 while considering various performance factors. This is because, the management system 10 displays, on the terminal 11, relocation plans (the selection results of the application 40 being relocation candidate) corresponding to the algorisms 66, respectively, and the administrator can select one plan or more plans to be executed from the relocation plans. This is also because that the algorisms 66 each corresponding to the different measured value (the number of IO issues, the change rate of the number of IO issues, and the like) of the different resource (such as the memory and the disk) can be stored in the logic table 60 to be used. Furthermore, this is also because that the management system 10 determines the attribute 63 of the algorism 66 when controlling the execution of the algorism 66.

Now, a second exemplary embodiment of the present invention will be described.

Figure 11:
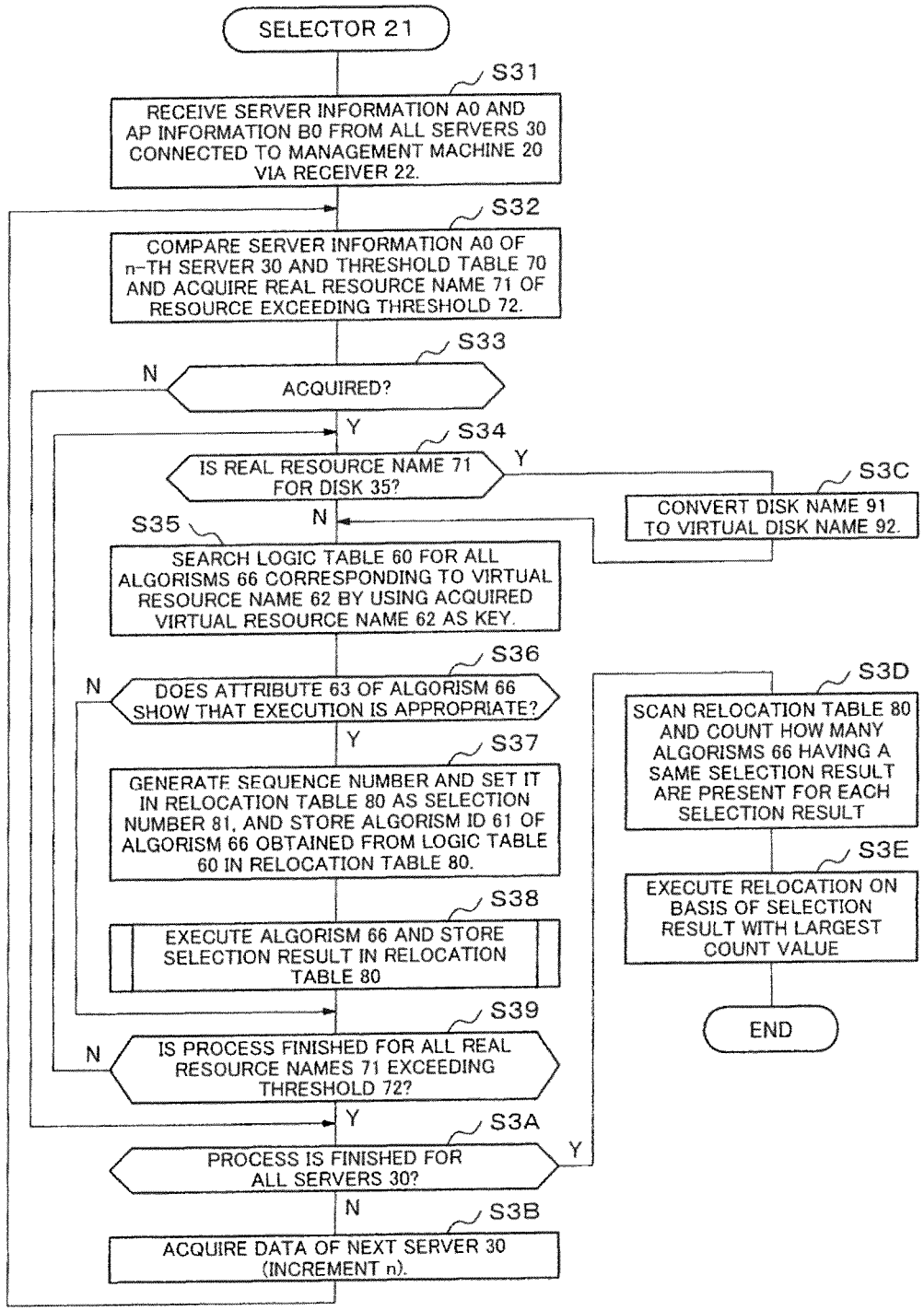
FIG. 11 is a flowchart of a process executed by a selector 21 according to a second embodiment.

FIG. 11 is a flowchart of a process executed by a selector 21 according to the second embodiment. Steps S31 to S3C in FIG. 11 are the same as steps S1 to SC in FIG. 9.

If execution of an algorism 66 is finished for all servers 30 (Y in S3A), the selector 21 according to the present embodiment scans a relocation table 80 to count how many algorisms 66 having the same selection result are present (S3D) for each selection result. The selector 21 executes relocation on the basis of the selection result with the largest count value (S3E). Other points in the present embodiment are same as those of the first embodiment.

A management system 10 according to the embodiment can appropriately execute relocation of an application 40 by taking various performance factors into consideration, without the intervention of an administrator. This is because that the selector 21 selects an appropriate selection result, from the selection results obtained by executing a plurality of algorisms 66, by majority voting.

A third exemplary embodiment of the present invention will be described below.

A logic table 60 according to the present embodiment stores "weight" corresponding to each algorism 66. The flowchart of a process executed by the selector 21 according to the embodiment is substantially the same as that in FIG. 11. However, the selector 21 scans a relocation table 80 to add the weight of the algorism 66 to each selected result, in stead of counting the number of the algorisms 66 having the same selection result (S3D). In addition, the selector 21 executes the relocation on the basis of the selection result with the largest additional value of weight, in stead of executing the relocation on the basis of the selection result with the maximum count value (S3E). Other points in the present embodiment are same as those of the second embodiment.

A management system 10 according to the present embodiment can execute relocation of an application in consideration of a weight of each resource without intervention of an administrator. This enables relocation determination to be made while considering the importance of the load of the severely competitive resource. For example, if a severe competition of a memory resource is anticipated due to the configuration of the management system 10 and the character of an application 40, the "weight" of the algorism 66 relating to the memory is increased to execute relocation while considering the importance of the memory state.

FIG. 12 shows the minimum configuration of a management machine 20 according to the present invention. The management machine 20 with the present configuration includes a receiver 22 and a selector 21. The receiver 22 receives, from a first server 31, server information A0 on the first server 31 and AP information B0 on a plurality of applications 40 located in the first server 31.

In this configuration, the receiver 22 does not acquire the server information A0 from a server 30 other than the first server 31. The reason is that if a relocation destination of the application 40 is known in advance from the load or configuration of another server 30, there is no need for acquisition. For example, this corresponds to the case where there is a back-up server in the management system 10.

The selector 21 selects a candidate application 40 from the plurality of applications 40 for each of a plurality of algorisms 66 referring to the AP information B0 and the server information A0, and that performs a relocation of one of the candidate applications 40 from the first server 31 to a second server 32. If the plurality of algorisms to be used is predetermined, the logic table 60 is not needed.

The previous description of embodiments is provided to enable a person skilled in the art to make and use the present invention.

Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents of the claimed invention even if the claims are amended during prosecution.

What is claimed is:

1. A management computing machine comprising:
a processor,
a logic table which stores a plurality of algorithms, each algorithm corresponding to one of a plurality of kinds of resources of a plurality of servers, each algorithm, as a given algorithm of the plurality of algorithms, being executed to select one of a plurality of application programs and one of the plurality of servers based on a combination of parameters, the parameters including the given algorithm itself and values of resource metrics measuring consumption or variation in consumption of one of the kinds of resources corresponding to the given algorithm, each algorithm to output a selection result designating a selected application program of the plurality of application programs and a selected server of the plurality of servers;
a receiver which receives, from each of the plurality of servers, AP information which is application program information including the values of the resource metrics of the resources of the server used by the application program located in the server, and server information including the values of the resource metrics of the resources of the server; and
a selector which selects more than one algorithm, as a plurality of selected algorithms, the selected algorithms selected by the selector from the algorithms stored in the logic table based on a kind of resource, the kind of resource decided based on the server information received by the receiver, the selector executing the selected algorithms to obtain corresponding selection results output by the selected algorithms, each selection result identifying a combination of an application program and a corresponding server for execution, and plurality of selection result giving the same combination of application program and the corresponding server for execution, the selector choosing a selection result that has a largest number of the selected algorithms with identical output from the plurality of selection results, the selector relocating the chosen application program to the server of the chosen selection result.

2. The management computing machine according to claim 1, wherein the selector decides more than one kind of the resources, and selects and executes the algorithms corresponding to the decided kinds of the resources.

3. A management system comprising:
a processor,
a plurality of servers; and
a management computing machine comprising:
a logic table which stores a plurality of algorithms, each algorithm corresponding to one of a plurality of kinds of resources of the plurality of servers, each algorithm, as a given algorithm of the plurality of algorithms, being executed to select one of a plurality of application programs and one of the plurality of servers based on a combination of parameters, the parameters including the given algorithm itself and values of resource metrics measuring consumption or variation in consumption of one of the kinds of resources corresponding to the given algorithm, each algorithm to output a selection result designating a selected application program of the plurality of application programs and a selected server of the plurality of servers;
a receiver which receives, from each of the plurality of servers, AP information which is application program information including the values of the resource metrics of the resources of the server used by the application program located in the server, and server information including the values of the resource metrics of the resources of the server; and
a selector which selects more than one algorithm, as a plurality of selected algorithms, the selected algorithms selected by the selector from the algorithms stored in the logic table based on a kind of resource, the kind of resource decided based on the server information received by the receiver, the selector executing the selected algorithms to obtain corresponding selection results output by the selected algorithms, each selection result identifying a combination of an application program and a corresponding server for execution, and plurality of selection result giving the same combination of application program and the corresponding server for execution, the selector choosing a selection result that has a largest number of the selected algorithms with identical output from the plurality of selection results, the selector relocating the chosen application program to the server of the chosen selection result.

4. A computer readable non-transitory medium recording thereon a management program which makes a computer:
store within a logic table a plurality of algorithms, each algorithm corresponding to one of a plurality of kinds of resources of a plurality of servers, each algorithm, as a given algorithm of the plurality of algorithms, being executed to select one of a plurality of application programs and one of the plurality of servers based on a combination of parameters, the parameters including the given algorithm itself and values of resource metrics measuring consumption or variation in consumption of one of the kinds of resources corresponding to the given algorithm, each algorithm to output a selection result designating a selected application program of the plurality of application programs and a selected server of the plurality of servers;
receive, from each of the plurality of servers, AP information which is application program information including the values of the resource metrics of the resources of the server used by the application program located in the server, and server information including the values of the resource metrics of the resources of the server; and
select more than one algorithm, as a plurality of selected algorithms, from the algorithms stored in the logic table based on a kind of resource, the kind of resource decided based on the server information received, execute the selected algorithms to obtain corresponding selection results output by the selected algorithms, each selection result identifying a combination of an application program and a corresponding server for execution, and plurality of selection result giving the same combination of application program and the corresponding server for execution, choose a selection that has a largest number of the selected algorithms with identical output from the plurality of selection results, and relocate the chosen application program to the server of the chosen selection result.

5. The computer readable non-transitory medium according to claim 4 recording thereon the management program which makes the computer:
decide one kind of the resources based on the sever information received by the receiver, and select and execute the algorithms corresponding to the decided kind of the resource.

6. The computer readable non-transitory medium according to claim 4 recording thereon the management program which makes the computer:
decide more than one kind of the resources, and select and execute the algorithms corresponding to the decided kinds of the resources.

7. A management method wherein a computer:
stores a logic table a plurality of algorithms, each algorithm corresponding to one of a plurality of kinds of resources of a plurality of servers, each algorithm, as a given algorithm of the plurality of algorithms, being executed to select one of a plurality of application programs and one of the plurality of servers based on a combination of parameters, the parameters including the given algorithm itself and values of resource metrics measuring consumption or variation in consumption of one of the kinds of resources corresponding to the given algorithm, each algorithm to output a selection result designating a selected application program of the plurality of application programs and a selected server of the plurality of servers;
receives, from each of the plurality of servers, AP information which is application program information including the values of the resource metrics of the resources of the server used by the application program located in the server, and server information including the values of the resource metrics of the resources of the server; and
select more than one algorithm, as a plurality of selected algorithms, from the algorithms stored in the logic table based on a kind of resource, the kind of resource decided based on the server information received, execute the selected algorithms to obtain corresponding selection results output by the selected algorithms, each selection result identifying a combination of an application program and a corresponding server for execution, and plurality of selection result giving the same combination of application program and the corresponding server for execution, choose a selection that has a largest number of the selected algorithms with identical output from the plurality of selection results, and relocate the chosen application program to the server of the chosen selection result.

8. The management method according to claim 7 wherein the computer:
   decides one kind of the resources based on the sever information received by the receiver, and selects and executes the algorithms corresponding to the decided kind of the resource.

9. The management method according to claim 8 wherein the computer:
   decides more than one kind of the resources, and selects and executes the algorithms corresponding to the decided kinds of the resources.

* * * * *